United States Patent [19]

Chu et al.

[11] Patent Number: 5,362,693
[45] Date of Patent: Nov. 8, 1994

[54] HIGH TEMPERATURE FIRED X7R DIELECTRIC CERAMIC COMPOSITION SUBMICRON PARTICLE SIZED BARIUM TITANATE

[75] Inventors: Mike S. H. Chu, Lewiston; Susan E. Corah, Niagara Falls, both of N.Y.

[73] Assignee: Tam Ceramics, Inc., Niagara Falls, N.Y.

[21] Appl. No.: 151,324

[22] Filed: Nov. 12, 1993

Related U.S. Application Data

[63] Continuation of Ser. No. 692,744, Apr. 29, 1991, abandoned.

[51] Int. Cl.$^5$ .................... C04B 35/46; C04B 35/48; C04B 35/49
[52] U.S. Cl. .................... 501/137; 501/135; 501/136; 501/138; 501/139
[58] Field of Search .............. 501/135, 136, 137, 138, 501/139

[56] References Cited

U.S. PATENT DOCUMENTS

| | | | |
|---|---|---|---|
| 4,803,591 | 2/1989 | Miyashita et al. | 361/321 |
| 4,816,430 | 3/1989 | Chu | 501/137 |
| 4,861,736 | 8/1989 | Ono et al. | 501/137 |
| 4,882,305 | 11/1989 | Chu et al. | 501/138 |
| 4,939,108 | 7/1990 | Dean | 501/137 |
| 5,084,424 | 1/1992 | Abe et al. | 501/137 |
| 5,086,021 | 2/1992 | Sasaki et al. | 501/137 |

FOREIGN PATENT DOCUMENTS

| | | | |
|---|---|---|---|
| 0020905 | 2/1984 | Japan | 501/138 |
| 2027010 | 2/1980 | United Kingdom | 501/138 |

OTHER PUBLICATIONS

Bonsack, "Dielectric Properties of Barium Titanate Containing Niobium and the Effect of Additives," pp. 488–492, American Ceramic Society Bulletin, vol. 50, No. 5 (May 1970).

*Primary Examiner*—Karl Group
*Assistant Examiner*—Michael Marcheschi
*Attorney, Agent, or Firm*—Kenyon & Kenyon

[57] ABSTRACT

The present invention provides ceramic compositions for preparing multi-layer capacitors (MLCs) having high dielectric constants between about 3000 and 4700 and stable temperature coefficients (TC) prepared from high purity barium titanate, niobium pentoxide, and cobalt oxide.

6 Claims, No Drawings

HIGH TEMPERATURE FIRED X7R DIELECTRIC CERAMIC COMPOSITION SUBMICRON PARTICLE SIZED BARIUM TITANATE

This is a continuation of application Ser. No. 07/692,744, filed on Apr. 29, 1991, now abandoned.

BACKGROUND OF THE INVENTION

The present invention relates to ceramic dielectri compositions which have dielectric constants between 2400 and 3000; low dissipation factor (DF), e.g. below 2%; high insulation resistance (R) capacitance (C) products (RC), e.g. above about 5000 ohm-farad at 25° C., above about 1000 ohm-farad at 125° C.; and stable temperature coefficient (TC), in which the dielectric constant does not alter from its base value at 25° C. by more than 15% over a temperature range from −55° C. to 125° C. In addition, the dielectric powders have an average particle size of less than 0.8 microns.

The ceramic compositions of this invention are useful in manufacturing multilayer ceramic capacitors (hereinafter MLC) which require a high capacitance and which typically have a relatively small size. MLC's are commonly made by casting or otherwise forming insulating layers of dielectric ceramic powder upon which conducting metal electrode layers, usually consisting of a palladium/silver alloy, are placed. Firing the material at temperature greater than or equal to 1280° C. is required to form the MLC device. Pure barium titanate (BaTiO$_3$) has a dielectric constant that is relatively unchanging with temperature changes except for a large spike at 125° C. The dielectric constant at this temperature tends to be as much as an order of magnitude greater than at room temperature. Downward Curie temperature shifters such as strontium, niobium, zirconium and lanthanum are commonly used to move the Curie point toward a more desirable temperature (e.g. 25° C.) where a high dielectric constant is required. The stability of the dielectric constant over a wide range of temperatures, and its insulation resistance, are important factors to be considered in selecting ceramic compositions for use in MLC's. For example, insulation resistance may vary substantially based on grain sizes after final sintering.

It is well known that a temperature stable MLC can be produced by firing barium titanate together with minor oxide additives for control of the final dielectric properties. In a desirable dielectric ceramic compositions for MLC applications which require stability in the dielectric constant over a wider temperature range, the dielectric constant will not change more than plus or minus 15% from its reference value at approximately room temperature (25° C.). The insulation resistance and capacitance product of such compositions should be more than 1000 ohm-farad at 25° C. and more from 100 ohm-farad at the maximum working temperature, usually 125° C., which are requirements in most industry specifications (e.g. EIA-RS198C).

Barium titanate which is used for commercial applications is at present physically characterized by a particle size distribution where 50% or greater of the particles are larger than 1 micron in diameter. It is well known that this can be achieved through air impact milling. This physical feature limits how thin an insulating layer or ceramic dielectric can be in a multilayer capacitor. Since MLC technology looks toward still more miniaturization in devices, it is more desirable to use a ceramic dielectric which is 26 physically characterized by a particle size distribution where 50% or greater of the particles are finer than 0.8 microns in diameter; has flat TC characteristics and in which the dielectric constant does not vary more than 15% from the base value at 25° C.; has a dielectric constant between 2400 and 3000; and the RC product at 25° C. is about 5000 ohm-farads, and about 1000 ohm-farads at 125° C.

However, ceramic compositions as disclosed in prior arts, such at U.S. Pat. Nos. 4,882,305 and 4,816,430 lose their property stability, especially TC characteristics, as the particle size of the powder is reduced to less than 0.8 microns. A typical example is given in the following. Without changing its ceramic composition, particle size of a typical dielectric material having a dielectric constant of about 3000 and less than plus or minus 15% TC is reduced from about 1.1 microns to 0.9, 0.8, 0.7, and 0.5 microns. The dielectric properties as shown below indicates that when the average particle size is less than 0.8 microns, the TC can no longer meet the plus or minus 15% requirements.

| Average particle size (μm) | 0.9 | 0.8 | 0.8 | 0.7 | 0.5 |
|---|---|---|---|---|---|
| Dielectric constant | 3050 | 3310 | 3495 | 4130 | 5011 |
| TC (%) at |  |  |  |  |  |
| −55° C. | −10.4 | −5.3 | −3.4 | −8.9 | −45.8 |
| 25° C. | 0 | 0 | 0 | 0 | 0 |
| 85° C. | −8.2 | −8.9 | −9.2 | −17.2 | −30.1 |
| 105° C. | −6.8 | −8.2 | −8.3 | −19.2 | −40.9 |
| 125° C. | 3.3 | 2.0 | −0.3 | −15.4 | −46.0 |

SUMMARY OF THE INVENTION

It is an object of the present invention to provide a dielectric ceramic composition which demonstrates dielectric constant stability over a wide temperature range for MLC applications.

It is another object of the present invention to produce a ceramic composition composed largely of a barium titanate powder which has a particle size distribution where 50% or greater of the particles are finer than 0.8 microns in diameter.

It is a further object of the present invention to incorporate the aforementioned fine particle size barium titanate in a ceramic composition having a dielectric constant which does not change by more than plus or minus 15% from its base value at 25° C.

It is still a further object of the present invention to provide a ceramic composition which incorporates said fine particle size barium titanate suitable for multilayer capacitor manufacture using precious metal internal electrodes and having a dielectric constant between about 2400 and 3000 at 25° C., a dissipation factor of less than 2%, and insulation resistance and capacitance product of about 5000 ohm-farads at 25° C., and about 1000 ohm-farads at 125° C. and also having a stable temperature coefficient characteristic which does not exceed a variation of plus or minus 15% from its reference value at 25° C.

The above stated objects are achieved by the present invention, which is a dielectric composition having stable TC characteristics; a major component being high purity barium titanate (BaTiO$_3$) of a fine particle size where 50% or greater of the particles are less than 0.8 microns in diameter, and two minor components comprising niobium pentoxide ($Nb_2O_5$) and cobalt oxide (CoO). The barium titanate used for this present invention is high purity, exceeding about 99% with no individual impurity element greater than about 0.5%, produced via chemical coprecipitation processes and other techniques described in prior art, e.g., by solid state reaction of high purity barium carbonate and titanium dioxide powders. The preferred stoichiometric ratio for the barium titanate is about 0.995, and the preferred average particle size is about 0.8 microns.

More specifically, in forming the dielectric ceramic compositions of the invention, the major component ($BaTiO_3$) comprises from about 95.9 to 98.0 percent by weight and the minor components comprise from about 1.9 to 3.7 percent by weight $Nb_2O_5$ and from about 0.10 to 0.40 percent by weight CoO.

When formed into multilayer capacitors by conventional methods, the ceramic compositions of this invention have stable TC characteristics with no variance beyond plus or minus 15% from a base value of 25° C. dielectric constants typically between 2400 and 3000 at 1 KHz, 1 VRMS, dissipation factors typically below 2% at 1 VRMS and insulation resistance and capacitance products typically greater that 5000 ohm-farads at 25° C., 50 VDC/mil, greater than 1000 ohm-farads at 125° C.

In an especially preferred embodiment, the ceramic dielectric compositions is formed from a mixture of 97.1 weight percent of high purity fine particle size $BaTiO_3$, 2.5 weight percent of $Nb_2O_5$ and 0.4 weight percent of CoO, with the $Nb_2O_5$ to CoO ratio being 6.25.

DETAILED DESCRIPTION OF THE INVENTION

As set forth below, the dielectric ceramic compositions of the present invention have several advantages which result in substantial technological advancement and cost savings without appreciable sacrificing of desirable physical and electrical properties.

The present invention provides a novel dielectric ceramic composition having a dielectric constant between 2400 and 3000, and with stable TC characteristics which can be prepared by firing the component oxides or precursors thereof at temperatures between 1280° C. and 1360° C. More particularly, the major component oxide has physical characteristics which differ from prior art, such that the average particle size is 0.8 microns in diameter or less.

A fired ceramic body of the present invention is produced by reacting, during the course of firing, the constituent dielectric oxides, including barium titanate, niobium pentoxide, and cobalt oxide. The reactants may be slurried together in water or physically blended together. The mixture of the ceramic preparation may be pressed into discs, or may be cast into a sheet using standard methods, and formed into a multilayer capacitor structure with internal electrodes comprised, e.g. of 70 percent palladium/30 percent silver, and fired at about 1280° C. to 1360° C. for about one to six hours.

The preferred niobium pentoxide for use in this invention is about 99% pure and has a particle size of about 0.5 to 0.9 microns and the preferred cobalt oxide is about 70-74% pure and has a particle size of less than about 1 micron.

Any conventional ceramic binder compositions may be used with this invention which is compatible with the other materials and simply provides a vehicle for dispersing the ceramic particles and holding them together when the solvent is removed. Suitable binder compositions are described in "Ceramic Process Before Firing" G.Y. Onoda, Jr , et al John Wiley and Son (1978) Chapter 19. Corn syrup and polyvinyl alcohol are examples of suitable binder compositions.

Details of preferred embodiments of the present invention are further described in the following examples.

EXAMPLES 1–5

30 to 50 grams of ceramics compositions were prepared by adding high purity barium titanate having an average particle size of about 0.8 microns, technical grade fine particle size niobium pentoxide, and technical grade fine particle size cobalt oxide according to the weight percent shown in Table I. The ceramic powders were further blended with 15 to 25 cc of distilled water and mixed thoroughly in a high speed Spex model 800-2 paint mixer, manufactured by Spex Industries, New Jersey, for 10 minutes. The wet slurry was then dried into a cake and ground with mortar and pestle. 2.4 to 4.0 cc of a binder solution including 26 weight percent propylene glycol and 48 weight percent corn syrup was mixed into the ceramic powder in a mortar and pestle which was then granulated through a 40 mesh nylon screen. Discs of the resultant mixture having a diameter of 1.27 cm and a thickness of 0.1 to 0.15 cm were pressed at a pressure of about 38,000 pounds per square inch in a stainless steel die. The discs were placed on a stabilized zirconia setter and fired at temperature of 1280° C. to 1360° C. for 0.5 hours. After cooling, silver electrodes were painted on the discs which were then fired at 815° C. to sinter on the electrodes. The capacitance (C), the dissipation factor (DF), and the capacitance change with temperature versus capacitance at 25° C. (TC) were then measured with a model ESI21-10A capacitance bridge at 1 KHz measurement frequency, from −55° C. to 125° C. at about 20° C. intervals. The dielectric constant (K) of each sample was then calculated from the fundamental capacitance equation:

$$K = 5.66 \times Ct/D^2$$

where
K = dielectric constant of the sample
t = thickness of the disc in inches
D = diameter of the disc in inches
C = capacitance of the disc in picofarads

TABLE I

| Example | weight % $BaTiO_3$ | $Nb_2O_5$ | CoO | Ratio $Nb_2O_5$/CoO | weight % $Nb_2O_5$/CoO |
|---|---|---|---|---|---|
| 1 | 98.0 | 1.9 | 0.1 | 19.0 | 2.0 |
| 2 | 97.3 | 2.2 | 0.1 | 22.0 | 2.3 |
| 3 | 96.0 | 3.2 | 0.8 | 4.0 | 4.0 |
| 4 | 96.0 | 3.6 | 0.4 | 9.0 | 4.0 |
| 5 | 96.0 | 3.7 | 0.3 | 12.3 | 4.0 |

The dielectric properties of examples 1–5 as summarized in Table II demonstrate that, when $Nb_2O_5$ and CoO are uniformly added to fine particle size high purity $BaTiO_3$, ceramic compositions with dielectric constants greater than 2500 with stable TC characteristics such as examples 1 and 2 are obtained.

The dielectric data in Table II also shows that when the total $Nb_2O_5$ and CoO weight percent is approximately 4 percent, dielectric constant is diminished, although stable TC characteristics and percent dissipation factor are maintained.

TABLE II

| Example | 1 KHz, K | 1 VRMS % DF | TC (%) at −55° C. | −30° C. | 85° C. | 125° C. |
|---|---|---|---|---|---|---|
| 1 | 2812 | 0.71 | −8.59 | −5.02 | −10.61 | −9.36 |
| 2 | 2634 | 0.69 | −3.94 | −1.84 | −11.10 | −10.87 |
| 3 | 1505 | 0.51 | −5.59 | −4.24 | −2.39 | 2.24 |
| 4 | 1723 | 0.56 | −6.75 | −5.32 | −2.19 | 3.0 |
| 5 | 2014 | 0.62 | −0.93 | −0.48 | −7.13 | −5.47 |

EXAMPLE 6

400 grams of a uniformly blended ceramic composition comprising 97.1 weight percent high purity barium titanate having an average particle size of about 0.8 microns, 2.5 weight percent niobium pentoxide and 0.4 weight percent cobalt oxide was charged into a ball mill with ½ inch alumina media together with 218 grams of a binder solution made by uniformly mixing and dissolving 186 grams dioctylphthalate, 90 grams Nuostabe V-1444 (Nuostabe V-1444 is an alkali ion free organic solvent dispersing agent available from Nuodex Co., Inc., New Jersey), 2597 ml ethanol and 270 ml toluene, and 372 grams Butvar B-76 vinyl resin (Butvar B-76 is a binder comprising a mixture of polyvinyl butyral, polyvinyl alcohol and polyvinyl acetate available from Monsanto Corp.).

This slurry was milled for 16 hours, discharged, and filtered through a 44 micron screen. This slurry, having a viscosity of about 1500 to 3000 centipoise, was then de-aired and cast, in accordance with standard techniques. The tape was converted into multilayer ceramic capacitors having 70 percent palladium/30 percent silver electrodes via conventional processes well known in the industry. Samples with no electrodes at all were also prepared for the purposes of comparison. The capacitors were preheated to 260° C. for 48 hours, placed on stabilized zirconia setters and sintered at 1280° C. to 1360° C. for 2 hours. The sintered capacitors had 10 active dielectric layers with dielectric thickness ranging from 0.85 to 1.1 mil. Termination electrodes of DuPont silver paint no. 4822, which is a mixture of silver and glass frit in binder, were applied at opposite ends of the multilayer capacitor to connect alternate electrode layers and these capacitors were fired at 815° C. in a tunnel furnace. The dielectric constant, dissipation factor, insulation resistance and capacitance product at 25° C. and 125° C. and TC were measured with the same instruments described in Examples 1–5. The results are shown in Table III below. The measurements were again performed from −55° C. to 125° C. in 20° C. increments.

TABLE III

| Firing temperature | 1260° C. | 1280° C. | 1300° C. |
|---|---|---|---|
| Dielectric thickness | 1.0 | 1.0 | 1.0 |
| Dielectric constant (25° C.) | 2315 | 2410 | 1780 |
| % DF (25° C.) | 0.98 | 1.04 | 0.96 |
| TC at −55° C. % | 1.5 | 5.8 | 5.9 |
| −30° C. | 0.5 | 3.3 | 3.6 |
| 85° C. | −2.2 | −4.5 | −5.1 |
| 125° C. | 1.2 | −2.2 | −6.2 |
| RC at 50 V/mil | | | |
| 25° C. | 12659 | 9743 | 5083 |
| 125° C. | 4018 | 5273 | 287 |
| Breakdown voltage (V/mil) | 1055 | 880 | 585 |

The dielectric properties of Table III demonstrate that multilayer ceramic capacitors manufactured from the ceramic composition described above demonstrate that when fired at less than 1300° C. a dielectric constant of about 2400 stable TC characteristics, low dissipation factor and high insulation resistance-capacitance products, greater than 9000 ohm-farad at 25° C. and greater than 5000 and 125° C. can be achieved. The dielectric properties of these MLC's meet and exceed the requirements listed in the Electronic Industries Association specification for X7R ceramic multilayer capacitors. For X7R, such specification demands that the capacitors meet the requirement of dissipation factor less than 3%, RC product greater than 1000 ohm-farad at 25° C., and greater than 100 at 125° C. and TC within plus or minus 15% from −55° C. to 125° C.

What is claimed is:

1. A ceramic composition having a dielectric constant between about 2400 and about 3000 at 25° C., and produced from a mixture consisting essentially of:

95.9 to 98.0% wt barium titanate;

1.9 to 3.7% wt niobium pentoxide;

0.1 to 0.4% wt cobalt oxide; and wherein the barium titanate has a purity of about 99%, a BaO/TiO$_2$ stoichiometric ratio of about 0.995;

and an average particle size equal to or less than about 0.8 μm; and the niobium pentoxide has a purity of about 99.0% and a particle size of 0.5 to 0.9 μm; and the cobalt oxide has a purity of about 70% to about 74% and a particle size of less than about 1 μm.

2. The ceramic composition of claim 1 wherein:

the barium titanate is 97.1% wt;

the niobium pentoxide is 2.5% wt;

the cobalt oxide is 0.4% wt; and the niobium pentoxide to cobalt oxide weight ratio is about 6.3, 3. A ceramic composition useful for making MLC's having a dielectric constant between 2400 and 3000 and TC characteristics that vary no more than about ±15 percent from their reference value at 25° C. over a temperature range of −55° C. to 125° C., the composition consisting essentially of a mixture of:

95.9 to 98.0% wt barium titanate;

1.9 to 3.7% wt niobium pentoxide;

0.1 to 0.4% wt cobalt oxide; and the mixture dispersed in a binder composition.

4. The ceramic composition of claim 3 wherein:

the barium titanate has a purity greater than about 99.0%;

the BaO/TiO$_2$ stoichiometric ratio is about 0.995; and an average particle size equal to or less than 0.8 μm.

5. The ceramic composition of claim 4 wherein:

the niobium pentoxide has a purity of about 99.0% and a particle size of 0.5 to 0.9 μm; and the cobalt oxide has a purity of about 70% to about 74% and a particle size equal to or less than 1 μm.

6. The ceramic composition of claim 3 wherein:

the barium titanate is 97.1% weight;

the niobium pentoxide is 2.5% weight;

the cobalt oxide is 0.4% weight; and the niobium pentoxide to cobalt oxide ratio is about 6.3.

* * * * *